United States Patent [19]

Kjøhl et al.

[11] Patent Number: 4,486,396

[45] Date of Patent: Dec. 4, 1984

[54] STABILIZED AMMONIUM NITRATE OR STABILIZED PRODUCTS HAVING A HIGH CONTENT OF AMMONIUM NITRATE, AND METHOD OF PRODUCING SUCH PRODUCTS

[75] Inventors: Olav Kjøhl, Heistad; Ellen Brekke, Mykland; Arne O. Egner, Rjukan, all of Norway

[73] Assignee: Norsk Hydro a.s., Oslo, Norway

[21] Appl. No.: 504,286

[22] Filed: Jun. 14, 1983

[30] Foreign Application Priority Data

Sep. 14, 1982 [NO] Norway ................................. 823108

[51] Int. Cl.$^3$ ............................................... C06B 1/04
[52] U.S. Cl. .......................................... 423/265; 71/58; 423/267; 423/275; 423/396
[58] Field of Search ............... 71/58; 423/396, 265, 423/267, 275

[56] References Cited

U.S. PATENT DOCUMENTS

| | | |
|---|---|---|
| 3,190,774 | 6/1965 | Wilson ................................ 423/267 |
| 3,368,929 | 2/1968 | Bell .................................... 423/267 |
| 3,379,496 | 4/1968 | Russo ................................. 423/396 |
| 3,493,445 | 2/1970 | Takata et al. .................... 423/267 |
| 4,316,736 | 2/1982 | Van Hijfte et al. ................ 71/58 |
| 4,408,998 | 10/1983 | Mutsers et al. .................. 423/396 |
| 4,409,016 | 10/1983 | Mutsers et al. .................. 423/396 |

*Primary Examiner*—John Doll
*Assistant Examiner*—Wayne A. Langel
*Attorney, Agent, or Firm*—Wenderoth, Lind & Ponack

[57] ABSTRACT

The present invention relates to ammonium nitrate or products having a high content of ammonium nitrate stabilized against swelling and break-down by thermal cycling, and a method for manufacturing such products. An amount of 0.05–1.0 weight % porous particles having a surface area of 150–400 m$^2$/g and a pore size of 100–300 Ångströms are included in the products. As porous particles, preferably silicon dioxide particles having a surface area of 250–350 m$^2$/g and a pore size of 100–250 Ångströms are used. The products are made by first drying granulated or prilled ammonium nitrate or products having a high content of ammonium nitrate and thereupon coating them with the porous particles, and if desired also adding a dust-binding agent and/or an anticaking agent. Ammonium nitrate thus conditioned is both as stable and porous as required for use in explosives and in addition it meets the requirements for so-called tropical grade ammonium nitrate. Fertilizers according to the invention, having a high content of ammonium nitrate, will also have an improved caking number and reduced tendency to dust formation because the water present will be bound in the pores of the conditioning agent.

6 Claims, No Drawings

STABILIZED AMMONIUM NITRATE OR STABILIZED PRODUCTS HAVING A HIGH CONTENT OF AMMONIUM NITRATE, AND METHOD OF PRODUCING SUCH PRODUCTS

The present invention relates to ammonium nitrate or products having a substantial content of ammonium nitrate stabilized against swelling and break-down by thermal cycling. Dust-binding agents and/or anticaking agents might be added to these products. The invention also comprises a method for producing stabilized ammonium nitrate or stabilized products having a substantial content of ammonium nitrate.

Ammonium nitrate is during production and storage, exposed to changes in crystal structure as it passes from one crystal phase to another. Ammonium nitrate is usually stated to occur in phase I, II, III, IV. Changes in crystal form occur by transition between the phases. This transition usually occurs at 84.2° C. (II-III), 32.1° C. (III-IV) and at about 50° C. ((II-IV). Especially at the transition from phase IV to phase III there will be an increase in volume. By repeated transitions between these two phases, the variation in volume will result in crumbling of the ammonium nitrate particles which are broken down to dust. The ammonium nitrate product is tested for stability by exposing it to thermal cycling between these two phases. If the product can endure several cyclings before it is broken down to dust, it is a relatively stable product. Generally speaking, it is considered that a high content of water will make the ammonium nitrate less stable to thermal cyclings.

Several additives are known for improving the stability of ammonium nitrate. Such additives can shift the temperature at which the ammonium nitrate changes from one phase to another, or it can result in transferring the ammonium nitrate directly from phase II to phase IV, whereby the phase transition which leads to volume change is avoided. Thus it is known from GB Pat. No. 914,606 to add $Mg(NO_3)_2$ in order to stabilize ammonium nitrate.

It is further known from U.S. Pat. No. 3,317,276 to stabilize ammonium nitrate by adding boric acid or a salt of this acid together with ammonium phosphate and ammonium sulphate.

Ammonium nitrate which is to be transported or stored in tropical areas is especially exposed to phase transition and thereby break-down of the particles to dust. There are therefore especially strict quality rules for such products, and it has been found that even if the original content of water in such products is quite low, below 0.2%, problems might occur.

Ammonium nitrate which is to be used in explosives and which must be able to absorb a certain amount of oil or fuel, should be more porous than ammonium nitrate to be used as fertilizer. Application of, for instance, magnesium nitrate as stabilizer, will not give the desired porosity for the ammonium nitrate particles for use in explosives. Thus magnesium nitrate is generally not a suitable agent for ammonium nitrate of explosive grade.

Another problem of ammonium nitrate is that it has to be treated with anticaking agents such that it becomes free-flowing during transport and spreading. Amines, for example, have been used for this purpose, possibly in mixture with other additives. The particles can also be powdered by agents which do not react with ammonium nitrate, for instance silica of the type obtained by cleaning the off-gases from ferro alloy plants.

The object of the present invention was to arrive at a method for stabilizing ammonium nitrate which made it suitable for being used in explosives.

A further object was to produce ammonium nitrate which also could be exposed to and endure the strain occuring under tropical conditions, i.e. ammonium nitrate of tropical quality.

As previously known, it is important that the ammonium nitrate end product has a low content of water. However, the ammonium nitrate particles must at the same time contain sufficient water after granulation and before drying that during the drying process the desired porosity is obtained for the particles. It has been found that if agents for binding water or shifting the phase transition temperature of the ammonium nitrate solution or melt are added before granulation, this might have a negative effect on the properties of the ammonium nitrate end product. This has for instance been found to be the case when magnesium nitrate is added before granulation. By adding magnesium nitrate to the ammonium nitrate melt a product is obtained which has excellent storing properties and excellent cycling stability, but this agent results in problems during drying of the product. A product is thereby obtained which does not have the required porosity, and accordingly this agent results in too dense prills which are not suitable for use in explosives. Besides, the magnesium nitrate substantially increases the hygroscopicity of ammonium nitrate.

Excellent stabilization of ammonium nitrate explosive grade is, however, obtained by addition before granulation of boric acid, diammonium phosphate and ammonium sulphate, when the content of water in the end product is kept low. But if relatively large amounts of the stabilizing agents are added, this results in granulated ammonium nitrate particles having low porosity.

If the stabilizing agent is added after the product is granulated or dried, it is hardly possible to shift the phase transition temperature, and the additive will in practice only influence the water content of the product and its ability to absorb water. Commonly used anticaking agents for ammonium nitrate did, however, not give excellent effect regarding the ability to endure thermal cycling. It has been found that conditioning agents which contain amine will substantially lower the product's thermal stability. During the cycling tests amine-containing conditioning agents will accelerate the deterioration of the particles. The effect of the water content will increase by a factor of about 10.

In spite of poor experiences by addition of water-binding agents after granulation, an attempt was made to find additives which could prevent swelling during thermal cycling. Additives which bind water as crystal water were found unsuitable, for instance because they had a negative effect on the caking properties of the product. The inventors then tried to use porous additives which could absorb water in their pores. It was then surprisingly found that the presence of such porous particles resulted in no movement of water in the ammonium nitrate particles. During thermal cycling of ammonium nitrate swelling was only registered to a small extent, and the product could be exposed to an unusually high number of cyclings before dust formation from the ammonium nitrate. It seemed that the water was so strongly bound in the pores of the additives that it did not have any negative effect on the caking properties of the ammonium nitrate. It was also found that common anticaking agents could be used in addition to the porous particles and especially the most preferred porous particles retained their ability to prevent swelling when they were combined with common anticaking agents. It was found that the most preferred way of adding the porous particles to the ammonium nitrate was after it was dried. In order to avoid loss of porous particles from the ammonium nitrate and thereby dust formation during further transport of the ammonium nitrate, it would be advantageous to add small amounts of dust-binding agents.

During further development of the method it was found that not any type of porous particles was suitable for this purpose. One important condition was that such particles had to be relatively inert to ammonium nitrate. This implies that for instance magnesium oxide can not be used. Further, the particle size should be such that the particles can be evenly distributed over the ammonium nitrate particles in such a way that they do not fall off at once. Silicates of the molecular sieve type can bind water, but it has been found to be difficult to give such additives the required particle size and binding to the ammonium nitrate particles. The inventors also tried to mix silica gel with ammonium nitrate particles in order to bind water. This also gave poor results. Instead of silica gel an attempt was made to use silicon dioxide which previously had been used as powdering agent for fertilizers. However, the silicon dioxide quality which had been used for this purpose proved to be unsuitable. It is quite reactive and even though it has a surface area of 15-10 $m^2/g$ and a particle size less than 1 micron, here called "silica C", it did not bind sufficient amounts of water for preventing swelling during thermal cycling. Other qualities of silicon dioxide were then investigated, and it was found that highly porous particles having a surface area of about 300 $m^2/g$ could bind large amounts of water. Even though the particle size of this type of silicon dioxide is larger than the previously mentioned type, it proved to be possible to mix these together with ammonium nitrate particles such that they could be transported without falling off and causing substantial dusting. In most cases it will, however, be safest to also use a dust-binding agent.

These tests were so promising that a series of tests was started in order to find the most suitable type of silicon dioxide and to find how these could be supplied to the ammonium nitrate particles. The reactivity of these very porous silicon dioxide particles with common anticaking agents was also investigated.

The invention will now be further described and explained in the following examples.

In examples 3 and 4 and some of the experiments given in the table two special types of silicon dioxide were used, having an average particle size of 4 microns and a surface area of about 300 $m^2/g$. The first type, here called "silica A" had an average pore diameter of 150 Ångströms, and the other type, of 200 Ångströms, was called "silica B".

EXAMPLE 1

The ammonium nitrate prills which the experiments was based on, were made from melt which was thrown out from a centrifuge and cooled in air. The finished product had a water content of 0.15-0.20% and was conditioned as known per se by 0.5 weight % kaolin and 0.1 weight % fatty amine.

This product was stored in ten 50 kg bags which were stacked, and was exposed to a load of 1000 kg. After having been stored for a period of 21 days, it was found that the unconditioned product was quite hard.

The caking tendency was measured in a conditioned room at 25° C. and 60% relative humidity. The unconditioned product was exposed to this test and had a caking number of about 2800. Caking numbers between 0 and 300 are considered quite good, from 300-800 average and over 800 poor.

By exposing the product to thermal cycling—14 cycles between 15° and 45° C.—tests were carried out regarding percent swelling and crumbling. It was found that the unconditioned product had a swelling of 18% and that 0.91% crumbled. The crushing strength was measured in grams for prill fractions 1.6-2.1 mm according to the method described in TVA-Report No. S-444, September 1970. The crushing strength was reduced from 0.832 g before cycling to 0.461 g after cycling.

EXAMPLE 2

Ammonium nitrate prills having the same size distribution and properties as described in example 1, were conditioned by 0.5% kaolin and 0.5% fatty amine. After a caking test in a conditioned room the product had a caking number of 718. Thermal cycling showed that the prills were broken down to a flourlike consistency, with a swelling of 35% and crumbling of 74%. When the crushing strength was measured, it proved to be reduced from 0.706 g before cycling to 0.287 g after cycling.

Further investigations showed that the amine in the conditioning agent had substantially reduced the thermal stability of the product.

EXAMPLE 3

Ammonium nitrate prills having the same size distribution and properties as described in example 1, were conditioned by 0.4 weight % silicon dioxide of the type "silica A" and 0.1 weight % mineral oil.

Laboratory tests showed that the caking tendency in a conditioning room was quite low. Caking numbers all the way down to 100 were obtained. Such conditioned prills gave no swelling and almost no crumbling. The crushing strength increased from 0.924 g before cycling to 1.380 g after cycling.

EXAMPLE 4

This example shows an investigation corresponding to that shown in example 3, but now there was used 0.4 weight % silicon dioxide of type "silica B". and 0.1 weight % mineral oil. The caking number was measured to be 170. Investigations of swelling and crumbling gave the same results as for example 3. The crushing strength increased from 0.960 g before cycling to 0.390 g after cycling. The product from example 4 was also tested in terms of dusting, and it was found to have substantially the same dusting properties as the products from example 3.

If a comparison is made between the crushing strength for a cycled product conditioned with "silica A"(B)/mineral oil with a cycled product conditioned with kaolin/fatty amine—as described in example 2—the results show that the crushing strength of the latter is reduced by as much as 70% compared to the products described in examples 3 and 4.

A series of tests were carried out corresponding to examples 1-4, in which the granulated/prilled and cooled ammonium nitrate was treated with different conditioning agents and/or silicon dioxide. Tests were also carried out where calcium silicate was used instead of silicon dioxide.

Experiments were carried out in which prills with and without common condition agents were tested. Thus treated ammonium nitrate was exposed to 14 cyclings, i.e. heated and cooled such that phase III⇌IV transition could occur.

Swelling and crumbling in percent as a result of this treatment was measured. The crushing strength of the ammonium nitrate particles before and after cycling was also measured. The caking number at 25° C. and 60% relative humidity was also measured. The results of these experiments are given in the table. The conditioning agent PVAc+octyl sulphate in the table is a commercial agent whose main component is a polyvinyl acetate and octyl sulphate. The agent is further described in U.S. Pat. No. 3,660,070.

Further investigations show that good results were obtained when as little as 0.05 weight % of porous particles were applied. All in all it was found that 0.2–0.5 weight % gave the best results, even though 1 weight % porous particles could be used. In order to obtain the desired effect the porous particles should have a surface area of 150–400 m$^2$/g and a pore size of 100–300 Ångströms. The best results were obtained when these values were 250–350 m$^2$/g and 100–250 Ångströms respectively.

TABLE

|  | (gram) Caking Number | (vol.-%) Swelling | (weight-%) Crumbling | (gram) Crushing strength Before cycling | After cycling |
|---|---|---|---|---|---|
| Conditioning agent (known agents) |  |  |  |  |  |
| 0,5% kaolin/ 0,1% fatty amine | 930 | 32,0 | 50,1 | 0,718 | 0,345 |
| 0,5% calcium silicate | 363 | 12,0 | 1,6 | 0,963 | 0,916 |
| 0,5% Ca—silicate/ 0,1% PVAc + octyl sulphate | 522 | 26,0 | 15,0 | 0,946 | 0,483 |
| 0,5% Ca—silicate/ 0,1% mineral oil | 468 | 22,0 | 7,7 | 0,823 | 0,506 |
| 0,5% "silica C" | 1135 | 18,0 | 1,5 | 0,891 | 0,665 |
| 0,5% silica gel, 50–100 mesh | 2170 | 14,2 | 3,0 | — | 0,677 |
| 0,5% silica gel, 2-5-6 m/m | 2120 | 2,8 | 0,6 | — | 1,247 |
| Conditioning agent (according to the invention) |  |  |  |  |  |
| 0,5% "silica B"/ 0,1% PVAc + octyl sulphate | 217 | 4,2 | 0,9 | 0,813 | 0,846 |
| 0,5% "silica A"/ 0,1% PVAc + octyl sulphate | 203 | 1,6 | 0,8 | 0,856 | 0,813 |
| 0,5% "silica B"/ 0,1% amine | 140 | 2,2 | 0,8 | 0,859 | 0,958 |
| 0,5% "silica B"/ 0,1% mineral oil | 170 | 0 | 0,9 | 0,864 | 1,354 |
| 0,5% "silica B" | 228 | 0 | 1,5 | 0,969 | 1,400 |
| 0,5% "silica A" | 333 | 0 | 1,1 | 0,904 | 1,397 |
| 0,5% "silica A"/ 0,1% mineral oil | 285 | 0 | 0,7 | 0,840 | 1,311 |

As can be seen from the table, only 0–4.2% swelling occurred when the special porous silicon dioxide was added, and only 0.7–1.5 weight % of the particles crumbled during the cycling process, while the corresponding figures for products conditioned in the known manner with kaolin and fatty amine was 35 volume % increase and 74.1 weight % crumbled product.

The crushing strength of the ammonium nitrate treated according to the invention changed very little during the cycling treatment, while it was reduced by 50% when conditioned according to known methods.

Application of calcium silicate, which also was expected to bind water, did however give too large increase in volume during the cycling treatment.

It is further seen from the table that application of "silica A" and "silica B" gives an ammonium nitrate product having substantially better properties regarding caking number, volume increase and crumbling than when "silica C" is applied. Thus there is 0% volume increase with the method according to the invention compared to 18% when treated by "silica C", and the respective caking numbers were 228–333 and 1135. Accordingly, it is obvious that "silica C" is not applicable to the invention in spite of the fact that this is also a silicon dioxide having a small particle size.

It is not quite clear why porous silicon dioxide of the above mentioned type gives such good effect. Seemingly the water present is so strongly bound in the pores of the silicon dioxide particles that there is not a sufficient amount of free water necessary for dissolving and recrystallizing ammonium nitrate such that phase III-⇌IV transition and the resulting volume change can occur.

The caking properties of ammonium nitrate conditioned with only porous silicon dioxide were relatively good. An attempt was made to apply a common anticaking agent in addition to silicon dioxide, and it was found that its effect was not weakened by the presence of such silicon dioxide.

In order to prevent dust formation during handling and transport of ammonium nitrate thus treated, about 0.1 weight % of the dust-binding agent, preferably mineral oil, was added.

When ammonium nitrate is conditioned according to the invention, a product is obtained which is stable and sufficiently porous to be suitable for use in explosives. It also meets the requirements for ammonium nitrate of tropical quality.

By conditioning, according to the invention, fertilizers having a substantial content of ammonium nitrate, the resulting products will attain positive effects because the water present will be bound in the pores of the conditioning agent. The products having a high substantial content of ammonium nitrate will have an improved caking number and reduced tendency for dust formation.

We claim:

1. Ammonium nitrate particles or particles having a substantial content of ammonium nitrate, stabilized against swelling and break-down by thermal cycling, having on the particle surface, as a stabilizing agent, 0.05–1.0 weight % of porous particles having a surface area of 150–400 m$^2$/g and a pore size of 100–300 Ångströms.

2. Stabilized particles according to claim 1, further containing at least one member selected from the group consisting of a dust-binding agent and an anticaking agent.

3. Stabilized particles according to claim 1, wherein the stabilizing agent is 0.2–0.5 weight % of porous silicon dioxide particles having a surface area of 250–350 m$^2$/g and a pore size of 100–250 Ångströms.

4. A method of producing the stabilized particles according to claim 1, which comprises drying granulated or prilled ammonium nitrate or a product having a substantial content of ammonium nitrate, and coating the dried granules or prills with 0.05–1.0 weight % of the porous particles having a surface area of 150–400 $m^2/g$ and a pore size of 100–300 Ångströms.

5. A method according to claim 4, further comprising incorporating at least one member selected from the group consisting of a dust-binding agent and an anticaking agent in the coating on the dried granules or prills.

6. A method according to claim 4, wherein the dried granules or prills are coated with 0.2–0.5 weight % of porous silicon dioxide particles having a surface area of 250–350 $m^2/g$ and a pore size of 100–250 Ångströms.

* * * * *